United States Patent
Shirayanagi et al.

(10) Patent No.: US 7,267,316 B2
(45) Date of Patent: Sep. 11, 2007

(54) BRACE ROTATING MECHANISM

(75) Inventors: Eiichi Shirayanagi, Hamamatsu (JP); Fumiyoshi Furuki, Hamamatsu (JP)

(73) Assignee: Yamaha Corporation (JP)

( * ) Notice: Subject to any disclaimer, the term of this patent is extended or adjusted under 35 U.S.C. 154(b) by 192 days.

(21) Appl. No.: 10/990,709

(22) Filed: Nov. 17, 2004

(65) Prior Publication Data

US 2005/0092891 A1    May 5, 2005

Related U.S. Application Data

(63) Continuation-in-part of application No. 10/430,421, filed on May 7, 2003, now Pat. No. 7,140,588.

(30) Foreign Application Priority Data

May 10, 2002   (JP)   ............................. 2002-135507

(51) Int. Cl.
  *G10C 3/02*   (2006.01)
  *G10C 1/04*   (2006.01)
  *G10B 3/00*   (2006.01)
(52) U.S. Cl. .......................... 248/351; 84/177; 84/180; 16/348; 16/357; 217/57
(58) Field of Classification Search ................ 248/351, 248/352, 357; 84/180, 174, 177, 178, 184; 52/127.2; 292/275, 76; 16/348, 357; 217/57, 217/60 C
See application file for complete search history.

(56) References Cited

U.S. PATENT DOCUMENTS

| | | | | |
|---|---|---|---|---|
| 1,303,441 A | * | 5/1919 | Wilton | ...................... 217/60 C |
| 1,335,626 A | * | 3/1920 | Villinger | ................... 217/60 C |
| 2,530,251 A |   | 11/1950 | Luberoff | |
| 3,225,856 A | * | 12/1965 | Caramanna | ............... 180/69.21 |
| D219,404 S |   | 12/1970 | White et al. | |
| 3,969,970 A |   | 7/1976 | Swift et al. | |
| 4,657,155 A |   | 4/1987 | Kendrick | |
| 4,920,592 A |   | 5/1990 | Scott | |
| 5,570,493 A | * | 11/1996 | Gulick | .......................... 27/18 |
| 6,469,237 B1 |   | 10/2002 | Arimori | |
| 6,545,203 B2 | * | 4/2003 | Arimori | ....................... 84/179 |

FOREIGN PATENT DOCUMENTS

FR   2 546 137 A1   11/1984
GB   488760   7/1938

(Continued)

OTHER PUBLICATIONS

European Search Report dated Feb. 9, 2004.

(Continued)

*Primary Examiner*—Anita M. King
(74) *Attorney, Agent, or Firm*—Dickstein, Shapiro, LLP.

(57) ABSTRACT

A brace is provided so as to be able to maintain the open position of a lid of a keyboard musical instrument (grand piano), is able to rotate between an erect position that maintains an open position of lid and a collapsed position, and is able to be self-standing in the erect position. A position regulating section is provided between brace and body of grand piano that maintains an angle of rotation of brace at a constant angle.

4 Claims, 7 Drawing Sheets

FOREIGN PATENT DOCUMENTS

| | | |
|---|---|---|
| JP | 53-147819 | 11/1978 |
| JP | 53-147820 | 11/1978 |
| JP | 62-51389 | 3/1987 |
| JP | 09-190174 A | 7/1997 |
| JP | 09190174 | 7/1997 |
| JP | 11272262 A | 10/1999 |
| JP | 2000-132159 A | 5/2000 |
| JP | 2000-206958 | 7/2000 |

OTHER PUBLICATIONS

Japanese Office Action dated Apr. 26, 2005 (and English translation of same).

* cited by examiner

BRACE ROTATING MECHANISM

CROSS REFERENCE TO RELATED APPLICATION

This application is a continuation-in-part of U.S. patent application Ser. No. 10/430,421 for "BRACE ROTATING MECHANISM" filed May 7, 2003 now U.S. Pat. No. 7,140,588, the content of which is incorporated herein by reference.

BACKGROUND OF THE INVENTION

1. Field of the Invention

The present invention relates to a brace or top stick rotating mechanism, and more particularly, to a brace rotating mechanism capable of preventing the lid or top board of a musical instrument such as a grand piano from inadvertently rotating.

2. Background Art

A Grand piano having a lid that is supported as to be able to be opened and closed on the top of a piano body has been widely used in the past. Known grand pianos are provided with an arm-like brace that maintains the piano lid in the opened state, and the brace is provided so as to be able to rotate between an erect position and a collapsed position. In order to allow this brace to adjust the opening angle of the lid in steps, two or three types of braces of varying lengths are provided. In addition, two receptacles capable of holding the end of these braces corresponding to each brace are attached in a row on the underside of the lid, and each receptacle is provided at a relative position at which the plane of the lid in the open position and axis of the brace are roughly perpendicular.

The task of holding the open position of the lid is performed by maintaining the open position of the lid with one hand while rotating the brace in the direction in which it becomes erect with the other hand, followed by placing the end of the brace in the corresponding receptacle so that the lid rests on the brace.

However, in the case of maintaining the open position of the lid, it is necessary to rotate the lid and brace roughly simultaneously in order to place the end of the brace in the receptacle. At this time, since the lid is quite heavy, the hand holding the lid can easily become shaky, resulting in the problem of the end of the brace shifting out of a position to a state in which it is not reliably held in the receptacle, and this becomes a factor that induces inadvertent rotation of the lid. In addition, since two receptacles are attached in a row, it is feared that the end of the brace is placed in the non-corresponding receptacle. When the end of the brace is placed in the receptacle in such a state, the open position of the lid becomes unstable due to the angle between the plane of the lid and the axis of each brace no longer being maintained roughly perpendicular, and as a result, the lid may end up closing due to an inadvertent impact and so forth, leading to the problem of causing a malfunction or damage to the grand piano.

However, there are some grand pianos that are provided with a contactable stopper at the base of the brace in order to facilitate the task described above. When the brace is put in the erect position in which it holds the lid, this stopper makes contact with the base of the brace and is provided so as to be able to maintain the angle of rotation of the brace by supporting this contact state by hand.

However, in the case of using such a stopper, since the brace ends up collapsing if force that presses the base of the brace against the stopper, namely force that rotates the brace in the direction of becoming upright, is not applied, the brace must unavoidably be supported with one hand. Thus, this leads to the problem of being unable to use both hands to perform the task of lifting up the lid with both hands.

SUMMARY OF THE INVENTION

As a result of focusing on the above problems, an object of the present invention is to provide a brace rotating mechanism that allows the task of maintaining the open position of the lid to be performed easily, while also being able to maintain the open position of the lid in a stable state.

A brace rotating mechanism of the present invention is provided so as to be able to maintain the open position of the lid of a keyboard musical instrument, and is provided being able to rotate between an erect position that maintains the open position and a collapsed position, wherein the brace is capable of self-standing in the erect position.

According to this constitution, since the state in which the brace is erect can be maintained independently, the lid can be placed on the end of the brace while holding the lid with both hands, thereby making it possible to facilitate the task of maintaining the open position of the lid. As a result, even a person with comparatively little arm strength, for example, can be perform the above task with ease.

DESCRIPTION OF THE PREFERRED EMBODIMENTS

Figure 1:
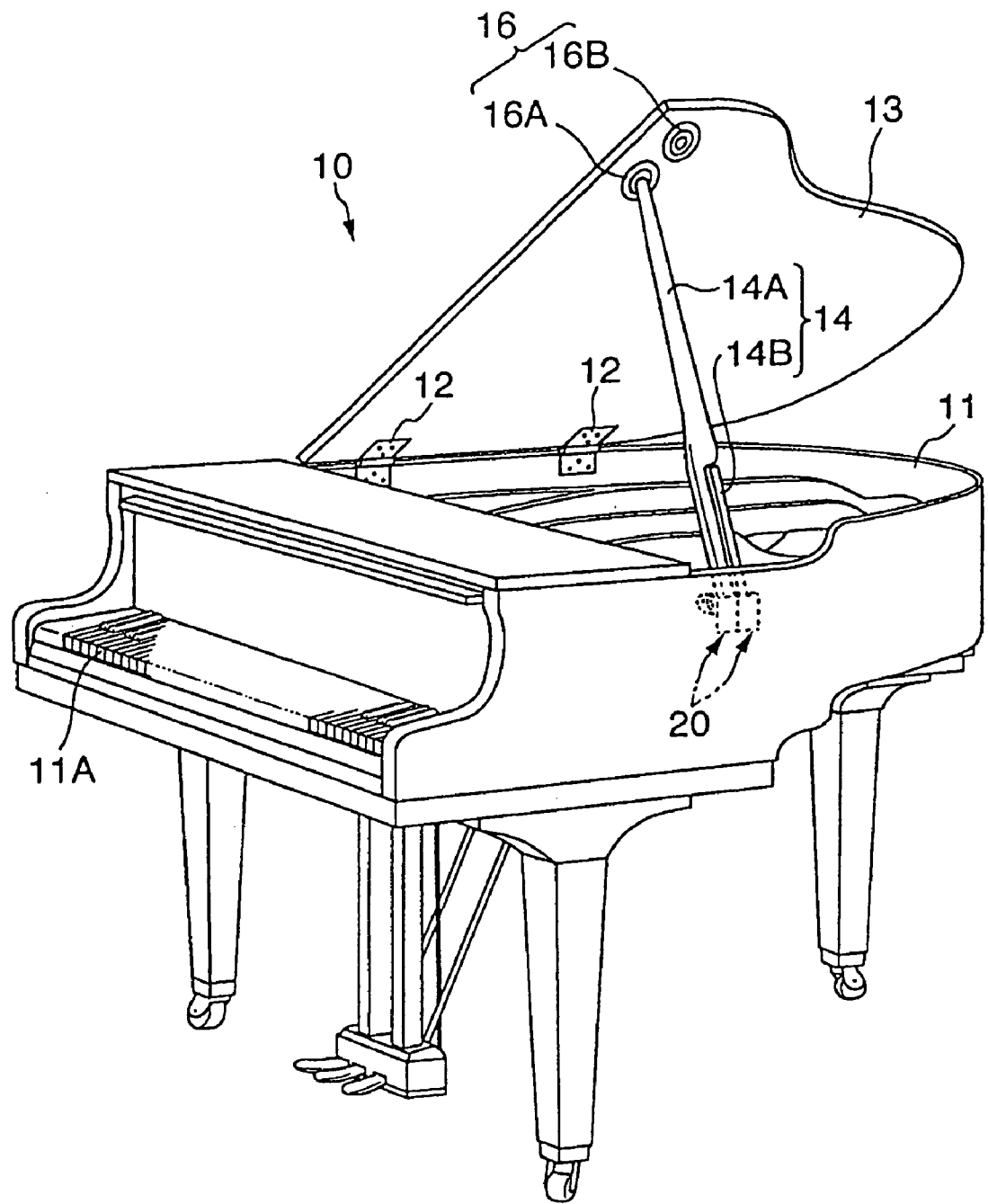
FIG. 1 is a schematic perspective view of a grand piano in which the rotating mechanism in a first embodiment is applied.

In the present invention, it is preferable to employ a constitution in which a position regulating section is provided at the base of the brace, and this position regulating section maintains the angle of rotation of the brace at a constant angle. As a result of employing this constitution, misalignment of the receptacle provided on the underside of the lid and the end of the brace as indicated in the example of the prior art can be prevented, and as a result, inadvertent rotation of the lid can be prevented. Moreover, in the case there are a plurality of mutually adjacent receptacles, mistaking the corresponding receptacle can also be avoided.

In addition, the position regulating section is composed of first and second position regulating bodies located on side of the center of rotation of the brace, and these first and second position regulating bodies interact to form the path of rotation of the brace, while when the brace is put in the erect position, maintain the angle of rotation of the brace by mutually engaging. If such a constitution is employed, the angle of rotation can be maintained while allowing rotation of the brace by the position regulating section, thereby making it possible to simplify the overall constitution of the rotating mechanism while also reducing its size.

Moreover, a constitution may be employed in which the position regulating section positions the brace in the erect position by using the weight of the brace itself when the brace is rotated from the collapsed position in the direction in which it becomes erect. As a result of employing this constitution, not only can the erect position of the brace be easily and reliably maintained, but it can also impart a sense of manipulation when positioned by the user.

Furthermore, in the present description, the term "grand piano" refers to the generic term for all pianos in which the lid opens and closes, and is used as a concept that also includes electronic pianos or the piano with tone generator having muting functions, having similar appearance.

The following provides an explanation of embodiments in which the brace rotating mechanism as claimed in the present invention is applied to a grand piano while referring to the drawings.

First Embodiment

FIG. 1 shows a schematic perspective view of a grand piano as claimed in the first embodiment. In this drawing, together with grand piano 10 being provided in a form in which the top side opens, it is composed of a body 11 having a prescribed action mechanism and so forth inside, hinges 12 provided at two locations along one edge of this body 11, lid 13 that is supported on body 11 by means of these hinges 12 and which is provided so as to be able to open and close the open side (top side) of body 11, brace 14 supported on other side of body 11, namely the opposite side of the attached locations of hinges 12, so as to be able to rotate on the inside of body 11, and receptacles 16 that hold the end of this brace 14.

Receptacles 16 are provided on the underside of lid 13 in the area of a corner of its free end. These receptacles 16 are composed of two receptacles 16A and 16B attached along the edge of the front side (side of keyboard 11A).

Each brace 14 is provided so as to be able to rotate between an erect position that maintains the open position of lid 13, and a collapsed position in which it is housed within body 11. This brace 14 is composed of two braces of different lengths in the axial direction provided at adjacent locations, namely a long brace 14A and a short brace 14B. Long brace 14A is placed in receptacle 16A when in the erect position (see FIG. 1), while short brace 14B is placed in receptacle 16B. Each length of braces 14A and 14B and the locations of receptacles 16A and 16B are set so that, when the ends of long brace 14A and short brace 14B are placed in their corresponding receptacles 16A and 16B, the plane of lid 13 and the axis of long brace 14A and short brace 14B are roughly perpendicular.

Long brace 14A and short brace 14B are respectively supported, at base ends therefor, by brackets 20 provided on the inside of body 11. Here, roughly similar structures are employed for each bracket 20, and in the following explanation, an explanation is provided only for long brace 14A and the bracket 20 that supports it, while an explanation of short brace 14B and the bracket 20 that supports it is omitted.

Figure 2:
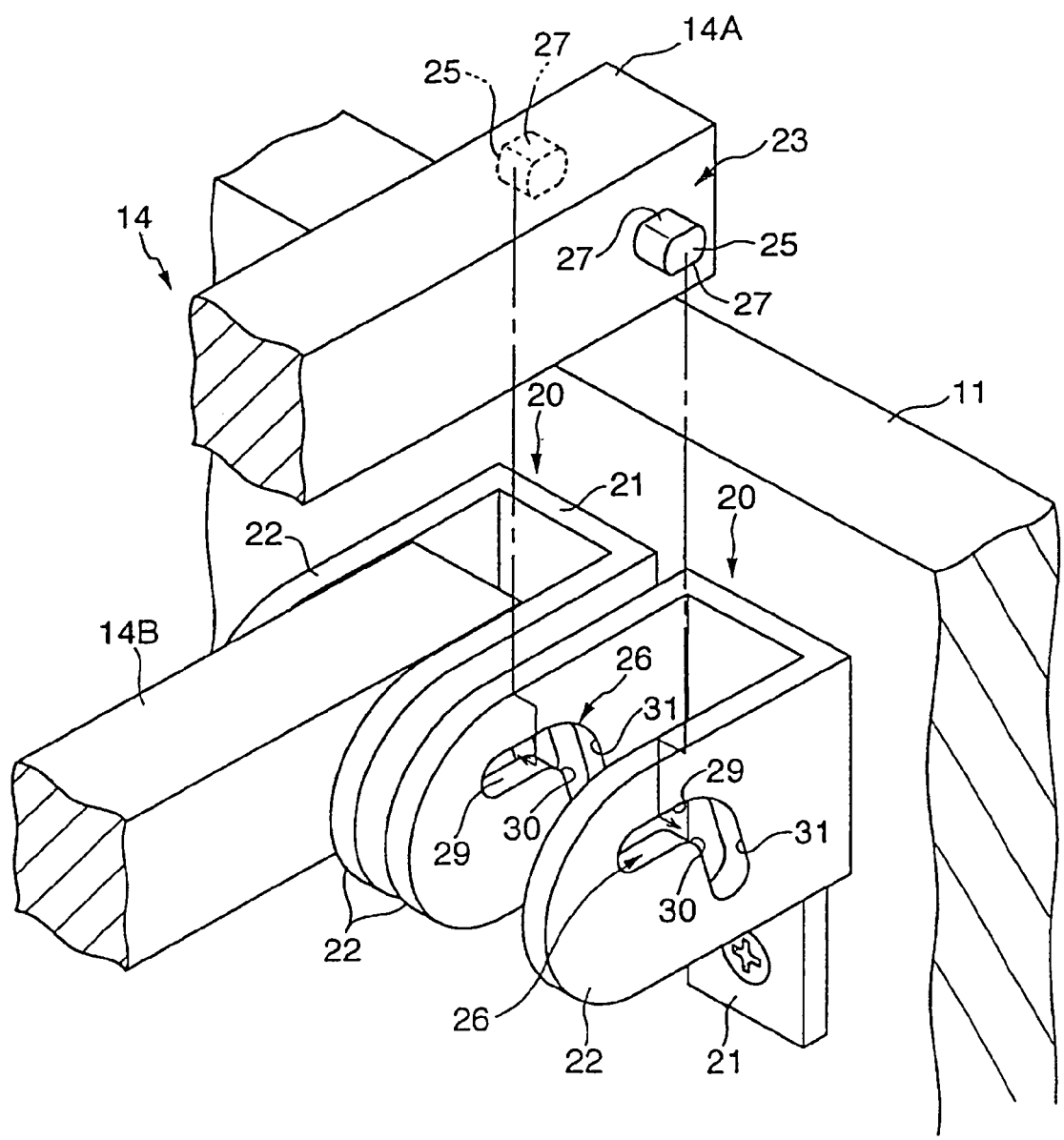
FIG. 2 is a partially exploded perspective view showing the rotating mechanism of FIG. 1.
Figure 3:
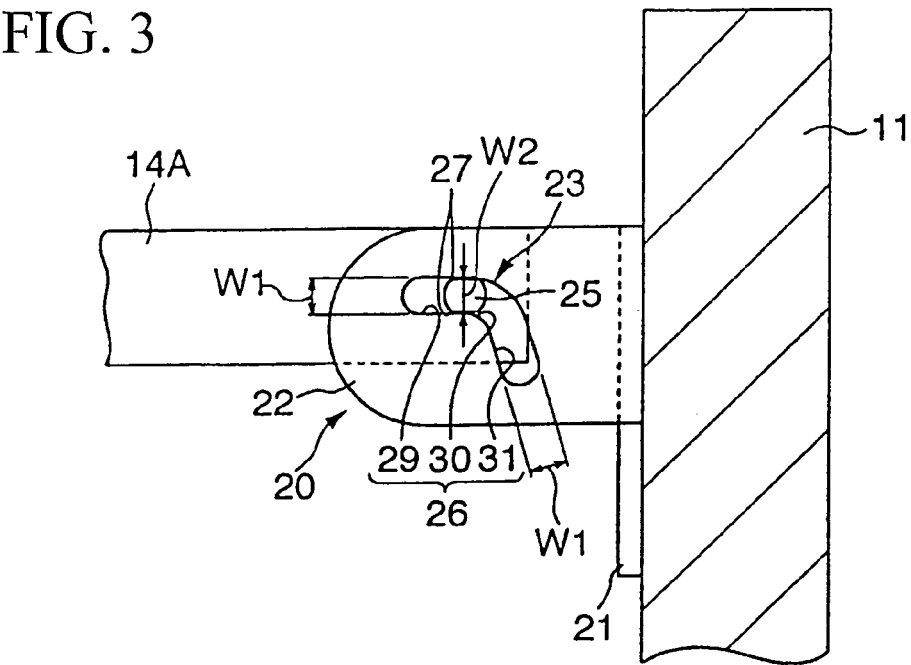
FIG. 3 is an explanatory drawing in which a long brace that composes the braces has been put in the collapsed position.
Figure 4:
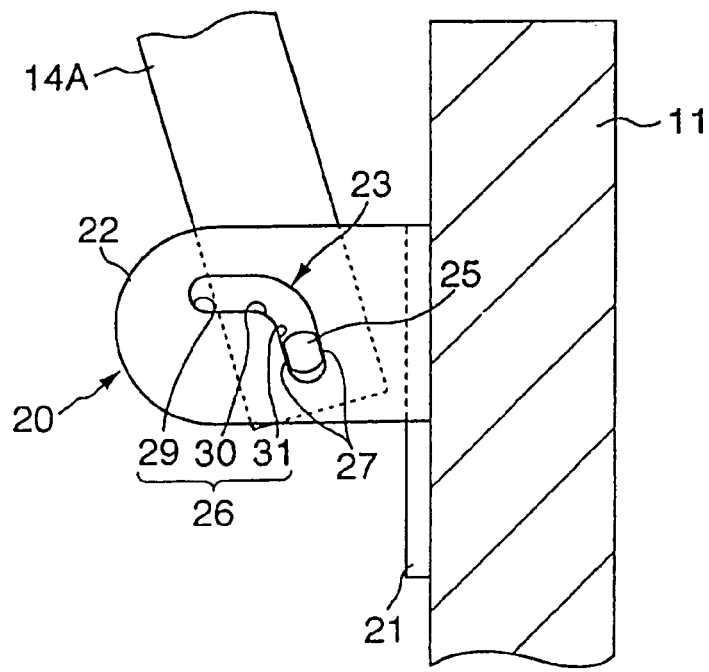
FIG. 4 is an explanatory drawing in which the long brace of FIG. 3 has been put in an erect position that maintains the open position of the lid.
Figure 5:
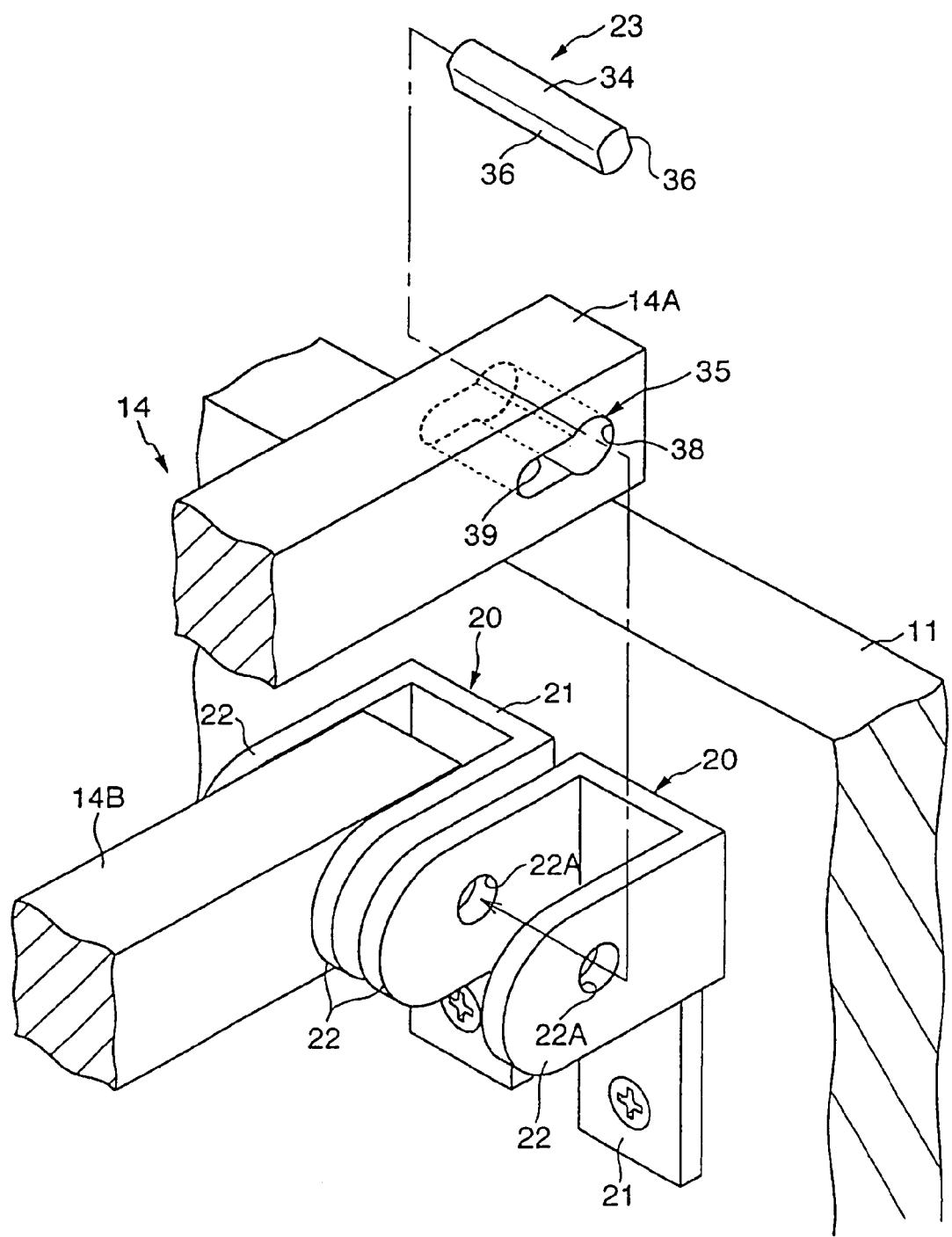
FIG. 5 is a perspective view similar to FIG. 2 of a rotating mechanism as claimed in a second embodiment.

As shown in FIGS. 2 through 4, together with bracket 20 being bolted to the inside of body 11, it is composed by providing plate-like mounting surface section 21 extending in the upward and downward directions, and a pair of supporting surface sections 22, which together with being located on roughly the vertical surface and continuous with both sides in the short direction (direction perpendicular to the paper in FIG. 3) of mounting surface section 21, are provided with an end having a roughly semicircular shape. Here, a position regulating section 23, which is provided at a base of long brace 14A, is positioned between bracket 20 and long brace 14A to maintain the angle of rotation of long brace 14A at a constant angle.

Position regulating section 23 is composed of shafts 25 in the form of a first position regulating body provided at the base of long brace 14A that protrudes from both sides in the radial direction of long brace 14A, and guides 26 in the form of a second position regulating body respectively formed within the planes of each supporting surface section 22 and provided so as to be able to respectively hold shafts 25. Each shaft 25 is provided to have an exterior surface in the shape of a cylindrical shaft from which a portion of the exterior surface has been cut away. More specifically, a pair of flat surfaces 27 that are roughly parallel to each other are provided on both sides in the direction of diameter of the shafts, namely the top and bottom sides in FIG. 3 in the state in which long brace 14A is in the collapsed position.

Each guide 26 is provided with a slot having a shape that curves at the intermediate portion in the direction in which it extends. More specifically, together with holding shaft 25 in the collapsed position of long brace 14A, guide 26 is provided with horizontal section 29 extending along the roughly horizontal direction, curved section 30 continuous from the mounting surface section 21 side (right side in FIG. 3) of horizontal section 29 and formed in the shape of an arc descending to the right in FIG. 3, and inclined section 31 continuous from curved section 30 that extends linearly downward on an angle to the right in FIG. 3. As shown in FIG. 4, the direction in which inclined section 31 extends is set to be roughly parallel to the axial direction of long brace 14A in the state in which long brace 14A is in the erect position in which the end of long brace 14A is placed in the corresponding receptacle 16A. In addition, the width in the short direction of guide 26, namely slot width W1, is formed roughly equal to or slightly wider than separation width W2 between each flat surface 27. As a result, each flat surface 27 of shafts 25 are able to move along the inside edge of guide 26.

Furthermore, in bracket 20 that supports short brace 14B, the direction in which the inclined section extends is set to be roughly parallel to the axis of short brace 14B when the end of short brace 14B is placed in the corresponding receptacle 16B. In addition, although short brace 14B rotates incidentally when long brace 14A is rotated in the direction in which it becomes erect, it can be erected by itself independent of long brace 14A when short brace 14B is held directly and rotated in the direction in which it becomes erect.

In the above constitution, in the case of maintaining lid 13 in the open position shown in FIG. 1 from the state in which it is closed, after first widely opening up lid 13 with one hand, long brace 14A is rotated from the collapsed position in the direction in which it becomes erect with the other hand. At this time, the path of rotation of long brace 14A is formed as a result of shaft 25 and guide 26 interacting, namely as a result of shaft 25 moving along the inside of curved section 30 of guide 26. When long shaft 14A has been rotated to the erect position at which it maintains the open position of lid 13, shaft 25 drops along inclined section 31 due to the weight of long brace 14A, and is arranged at the bottom of said inclined section 31 (see FIG. 4). At this time, each flat surface 27 and the inside of inclined section 31 are engaged in a state in which they mutually make surface contact, enabling the angle of rotation of long brace 14A to be maintained and long brace 14A to be self-standing in the erect position. The self-standing means the following: At the erect position or the vicinity thereof, the movement of the base of long brace 14A is restricted in the direction orthogonal to the axis of long brace 14A (that is, in the horizontal direction). Accordingly, the base of long brace 14A cannot be moved in the direction orthogonal to the axis. On the other hand, at the position, the base of long brace 14A can be moved only in the upward direction of the axis, i.e., to the end of long brace 14A.

Subsequently, by rotating lid 13 in the direction in which it closes, the end of long brace 14A precisely fits into the corresponding receptacle 16A.

In the case of closing lid 13 from this state, after slightly lifting up lid 13 in the direction in which it opens, long brace 14A should be rotated in the direction in which it collapses. At this time, long brace 14A should be raised along the axial direction of long brace 14A and rotated so that shafts 25 follow the curved section 30 after being released from inclined section 31.

Furthermore, in the case of short brace 14B as well, lid 13 can be opened in roughly the same manner as long brace 14A, and as a result, the opening angle of lid 13 can be adjusted to two levels.

Thus, according to this first embodiment, since each brace 14A and 14B is provided so as to be self-standing in the erect position, when the end of each brace 14A and 14B is placed in receptacles 16A and 16B, lid 13 can be held with both hands. When each of brace 14A and 14B experiences a horizontal external force at the erect position, it does not fall easily. Therefore, even if unexpected impulses are applied to brace 14A and 14B, there is no possibility that lid 13 rotates to be closed, which gets rid of the danger that a hand of human beings is caught in lid 13.

In addition, since guides 26 are provided in a curved shape having curved section 30, each brace 14A and 14B can be rotated smoothly with minimal frictional resistance between shafts 25 and curved section 30. Moreover, since the direction in which inclined section 31 extends is set to be roughly parallel to the axial direction of long brace 14A when placed in the erect position, when each brace 14A and 14B is collapsed, each brace 14A and 14B should be lifted along the axial direction of each brace 14A and 14B, thereby being able to easily impart a sense of manipulation to a user.

Second Embodiment

Next, an explanation is provided of a second embodiment of the present invention. Furthermore, in the following explanation, the same reference symbols are used as necessary for the same or equivalent constituent members of the first embodiment, and their explanation is either omitted or simplified.

FIGS. 5 through 9 show a second embodiment of a rotating mechanism as claimed in the present invention. This embodiment is characterized by attaching shaft 34 as a first position regulating body in bracket 20, and providing guide 35 as a second position regulating body in brace 14.

Figure 7:
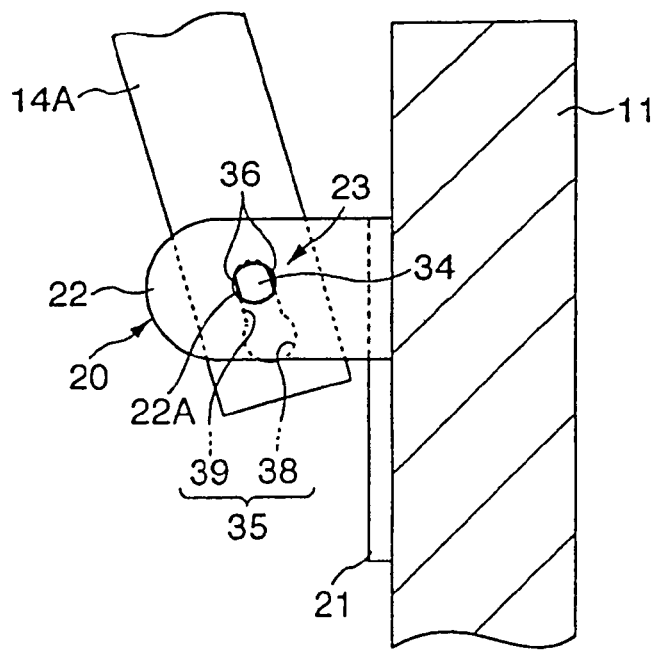
FIG. 7 is an explanatory drawing in which the long brace of FIG. 6 has been put in an erect position that maintains the open position of the lid.
Figure 9:
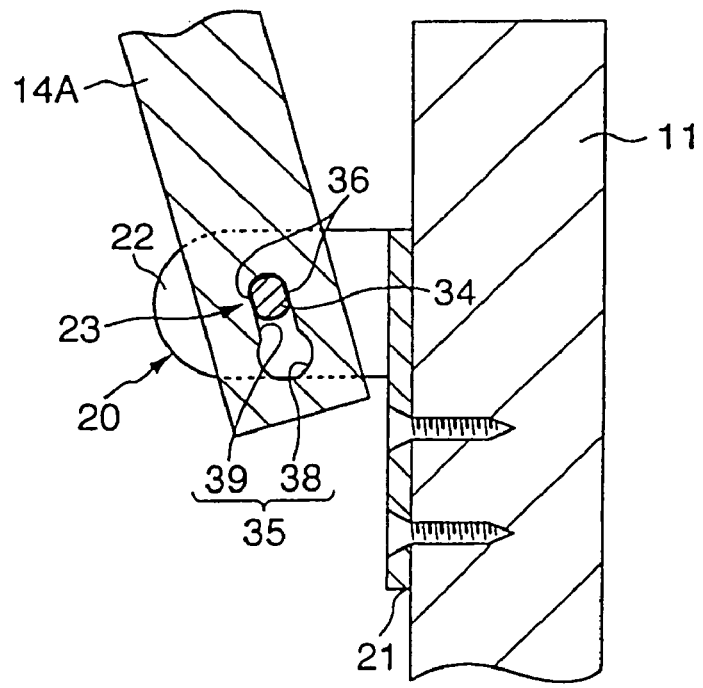
FIG. 9 is a front cross-sectional view of FIG. 7.

Namely, shaft 34 in this second embodiment is supported while being unable to rotate in holes 22A provided within the plane of each supporting surface section 22. In addition, shaft 34 is provided with flat surfaces 36 in the same manner as the first embodiment, the orientation of each flat surface 36 is set to be roughly parallel to the axial direction of long brace 14A that maintains lid 13 in the open position as shown in FIGS. 7 and 9.

Figure 6:
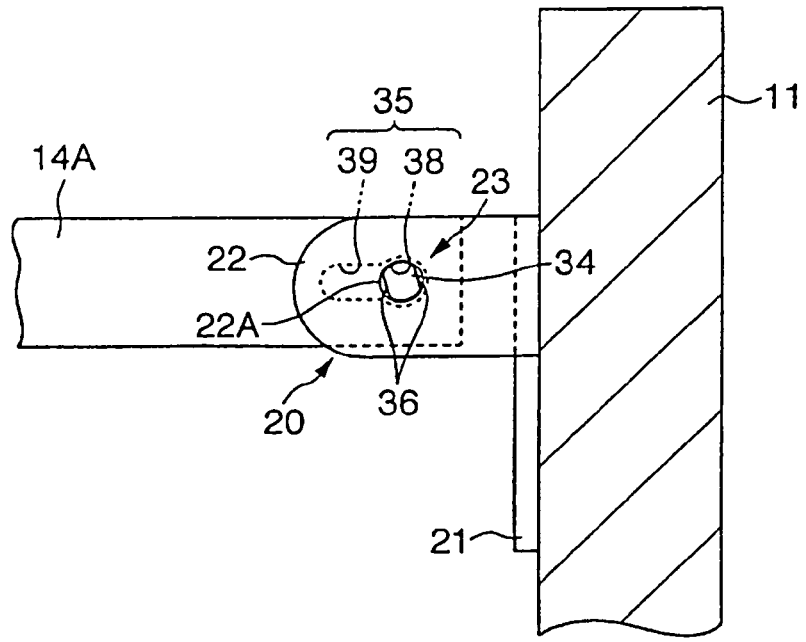
FIG. 6 is an explanatory drawing in which a long brace that composes the braces has been put in the collapsed position.
Figure 8:
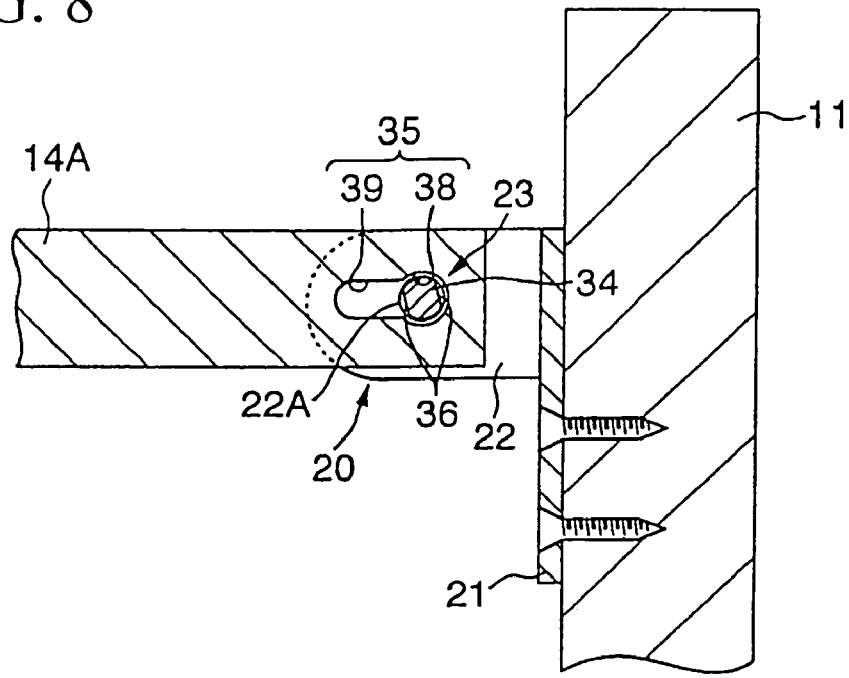
FIG. 8 is a front cross-sectional view of FIG. 6.

As shown in FIGS. 6 and 8, guide 35 is provided in the form of a keyhole oriented horizontally when viewed from the side. More specifically, when long brace 14A is put in the collapsed position, large diameter hole 38 that receives shaft 34, and slot 39 that is continuous with this large diameter hole 38 and extends towards the end of long brace 14A, are provided. While the inner diameter of large diameter hole 38 is set to be slightly larger than the outer diameter of shaft 34, the width of slot 39 is set to be roughly equal to the separation width between flat surfaces 36.

In the above constitution, in the case long brace 14A is rotated from the collapsed position in the direction in which it becomes erect, large diameter hole 38 of guide 35 rotates along the outer periphery of shaft 34. As a result of rotating long brace 14A to the erect position where it maintains lid 13 in the open position, long brace 14A lowers due to its own weight and shaft 34 is received inside slot 39. At this time, each flat section 36 of shaft 34 and slot 39 mutually engage enabling long brace 14A to be self-standing.

Thus, according to this second embodiment, the angle of rotation of long brace 14A can be maintained in the same manner as the first embodiment, and the task of maintaining lid 13 in the open position can be carried out easily. In addition, since the path of rotation of long brace 14A is formed as a result of large diameter hole 38 rotating along the outer periphery of shaft 34, this rotating operation can be carried out more smoothly.

Furthermore, there are no restrictions on the constitution of position regulating section 23 of the present invention in either of the previously mentioned embodiments, and various design changes can be made provided brace 14 is composed to be self-standing.

In addition, brace 14 is not limited to the constitution examples shown in the drawings, but rather a constitution may be employed wherein the base of long brace 14A is divided into two branches, and short brace 14B is then incorporated between those branches.

Figure 10:
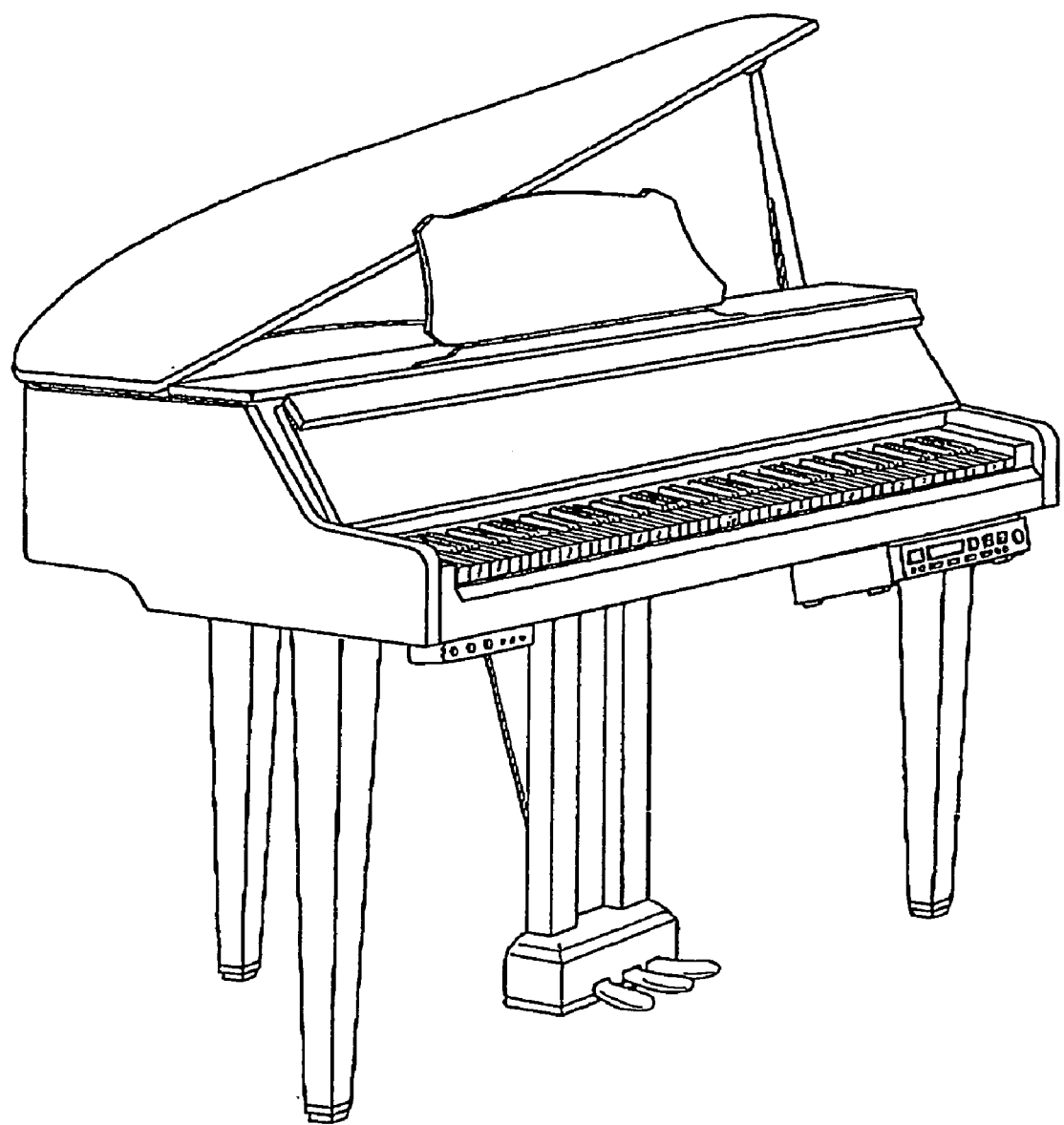
FIG. 10 is a schematic perspective view of an electronic piano.

Moreover, a keyboard musical instrument not limited to the constitution of the grand piano shown in FIG. 1, and instead, a constitution may be employed of the electronic piano shown in FIG. 10.

As has been explained above, according to the present invention, since a constitution is employed in which a brace is allowed to be self-standing in an erect position that maintains a lid in an open position, the lid can be placed on the end of the brace while holding with both hands without having to support the brace by hand, thereby making it possible to easily maintain the open position of the lid.

In addition, since a position regulating section that maintains the angle of rotation of the brace at a constant angle is provided at the base of the brace, misalignment of a receptacle on the underside of the lid and the end of the brace can be prevented, thereby making it possible to eliminate the problems exhibited by the prior art.

Moreover, since first and second position regulating bodies that compose the position regulating section interact to form the path of rotation of the brace, while maintaining the angle of rotation of the brace by mutually engaging when the brace is put in the erect position, the constitution of the entire rotating mechanism can be simplified and be made to be compact.

In addition, in the case of employing a constitution in which the position regulating section positions the brace in the erect position by using the weight of the brace itself, the erect position can be maintained both easily and reliably.

What is claimed is:

1. An apparatus for selectively maintaining an open position of a lid of a keyboard musical instrument, said apparatus comprising:
    a brace that is operable to rotate about a center of rotation between an erect position that maintains the open position, and a collapsed position, in which the brace is housed in a body of the keyboard musical instrument when the lid of the keyboard musical instrument is closed, the brace including first position regulating bodies, provided on a base of the brace, that protrude from both sides of the base; and
    a bracket affixed to the body of the keyboard instrument and operatively engaged with the base of the brace, the bracket including a second position regulating body which includes a horizontal section extending in a horizontal direction, a curved section continuous therewith formed in a shape of an arc downward, and an inclined section continuous therewith extending linearly downward,
    wherein the brace, via the first regulating bodies and the second regulating body, interacts with the bracket to form a path of rotation of the brace, the angle of rotation of the brace being maintained at a constant angle by mutually engaging the first regulating bodies on the brace with the second regulating body in the bracket, such that, at the erect position, the base does not move in a position orthogonal to an axis of the brace and moves only in a direction to the end of the brace of the axis of the brace.

2. The apparatus according to claim 1, wherein the first and second position regulating bodies position the brace in the erect position using a weight of the brace when the brace is rotated in a direction of becoming erect from the collapsed position.

3. An apparatus for selectively maintaining an open position of a lid of a keyboard musical instrument, said apparatus comprising:
    a brace that is operable to rotate about a center of rotation between an erect position that maintains the open position and a collapsed position, in which the brace is housed in a body of the keyboard musical instrument when the lid of the keyboard musical instrument is closed, the brace including a first position regulating body formed in a base of the brace and roughly oriented along a lengthwise direction of the brace, the first position regulating body having a large diameter hole and a slot continuous therewith extending toward the end of the brace;
    a bracket affixed to the body of the keyboard instrument and operatively engaged with the base of the brace; and
    a second position regulating body, attached in the bracket, the second position regulating body having flat surfaces,
    wherein the brace, via the first position regulating body and the second position regulating body, interacts with the bracket to form a path of rotation of the brace, the angle of rotation of the brace being maintained at a constant angle by mutually engaging the first position regulating body in the brace with the second position regulating body in the bracket, such that, at the erect position, the base does not move in a position orthogonal to an axis of the brace and moves only in a direction to the end of the brace of the axis of the brace.

4. The apparatus according to claim 3, wherein the first and second position regulating bodies position the brace in the erect position using a weight of the brace when the brace is rotated in a direction of becoming erect from the collapsed position.

* * * * *